US012777116B2

(12) United States Patent
Hangsleben

(10) Patent No.: US 12,777,116 B2
(45) Date of Patent: Oct. 27, 2026

(54) COMMUNICATIONS DIRECT TO INMATE

(71) Applicant: Dave W. Hangsleben, Sioux Falls, SD (US)

(72) Inventor: Dave W. Hangsleben, Sioux Falls, SD (US)

(73) Assignee: HANK TECHNOLOGY LLC, Hermosa, SD (US)

( * ) Notice: Subject to any disclaimer, the term of this patent is extended or adjusted under 35 U.S.C. 154(b) by 297 days.

(21) Appl. No.: 18/400,094

(22) Filed: Dec. 29, 2023

(65) Prior Publication Data

US 2025/0023982 A1 Jan. 16, 2025

Related U.S. Application Data

(60) Provisional application No. 63/526,243, filed on Jul. 12, 2023.

(51) Int. Cl.
*H04M 3/38* (2006.01)

(52) U.S. Cl.
CPC .......... *H04M 3/38* (2013.01); *H04M 2201/42* (2013.01); *H04M 2203/60* (2013.01)

(58) Field of Classification Search
CPC ............... H04M 3/38; H04M 2201/42; H04M 2203/60; H04W 48/02; H04W 48/03; H04W 64/00
See application file for complete search history.

(56) References Cited

U.S. PATENT DOCUMENTS 8,295,864 B2 10/2012 Samaha
9,479,651 B1 10/2016 Welker-Muraguri et al.
9,614,955 B2 * 4/2017 Hodge .................... H04W 4/12
10,631,141 B2 4/2020 Hangsleben
2013/0044867 A1 * 2/2013 Walters ............... H04M 3/2281 379/195
2014/0334610 A1 * 11/2014 Hangsleben ........ H04M 1/2477 379/85
2015/0213708 A1 7/2015 Barzangi et al.
2015/0215254 A1 7/2015 Bennett
2015/0319612 A1 * 11/2015 Hodge ................ H04W 12/062 455/411
2016/0373382 A1 12/2016 Reed et al.
2017/0055302 A1 2/2017 Wang et al.
2017/0149962 A1 5/2017 Hodge
2018/0139589 A1 * 5/2018 Hangsleben ...... H04M 1/72463
2019/0014062 A1 * 1/2019 Hodge .................. H04L 67/306
2021/0021708 A1 * 1/2021 Seyfetdinov ............ H04M 3/42

* cited by examiner

*Primary Examiner* — Joshua L Schwartz
(74) *Attorney, Agent, or Firm* — Seager, Tufte & Wickhem, LLP

(57) ABSTRACT

An example of an inmate information communication system may include a wireless inmate device including a Wi-Fi radio that is associated with a predetermined and unique telephone number, wherein the wireless inmate device is located inside of an incarceration facility. The inmate information communication system may include a server. The server may be configured to: receive, from an outside device, an inbound communication request to the unique telephone number associated with the wireless inmate device, responsive to the receipt of the inbound communication request, authorize the inbound communication request, and responsive at least to the authorization of the inbound communication request, establish a communication session between the wireless inmate device and the outside device.

19 Claims, 6 Drawing Sheets

COMMUNICATIONS DIRECT TO INMATE

CROSS-REFERENCE TO RELATED APPLICATIONS

This application claims priority to U.S. Provisional Application 63/526,243 filed Jul. 12, 2023, the entire contents of which is incorporated by reference.

BACKGROUND

Inmates housed in penal institutions such as incarceration and/or correctional facilities can be permitted to communicate with friends, family, and/or others. For example, a family member can communicate with an inmate housed in penal institution while the family member is physically present at the penal institution and/or while the family member is remotely located from the penal institution. Such communications may have various security considerations, logistical considerations, and/or privacy considerations, among other considerations associated therewith.

DETAILED DESCRIPTION

Figure 1:
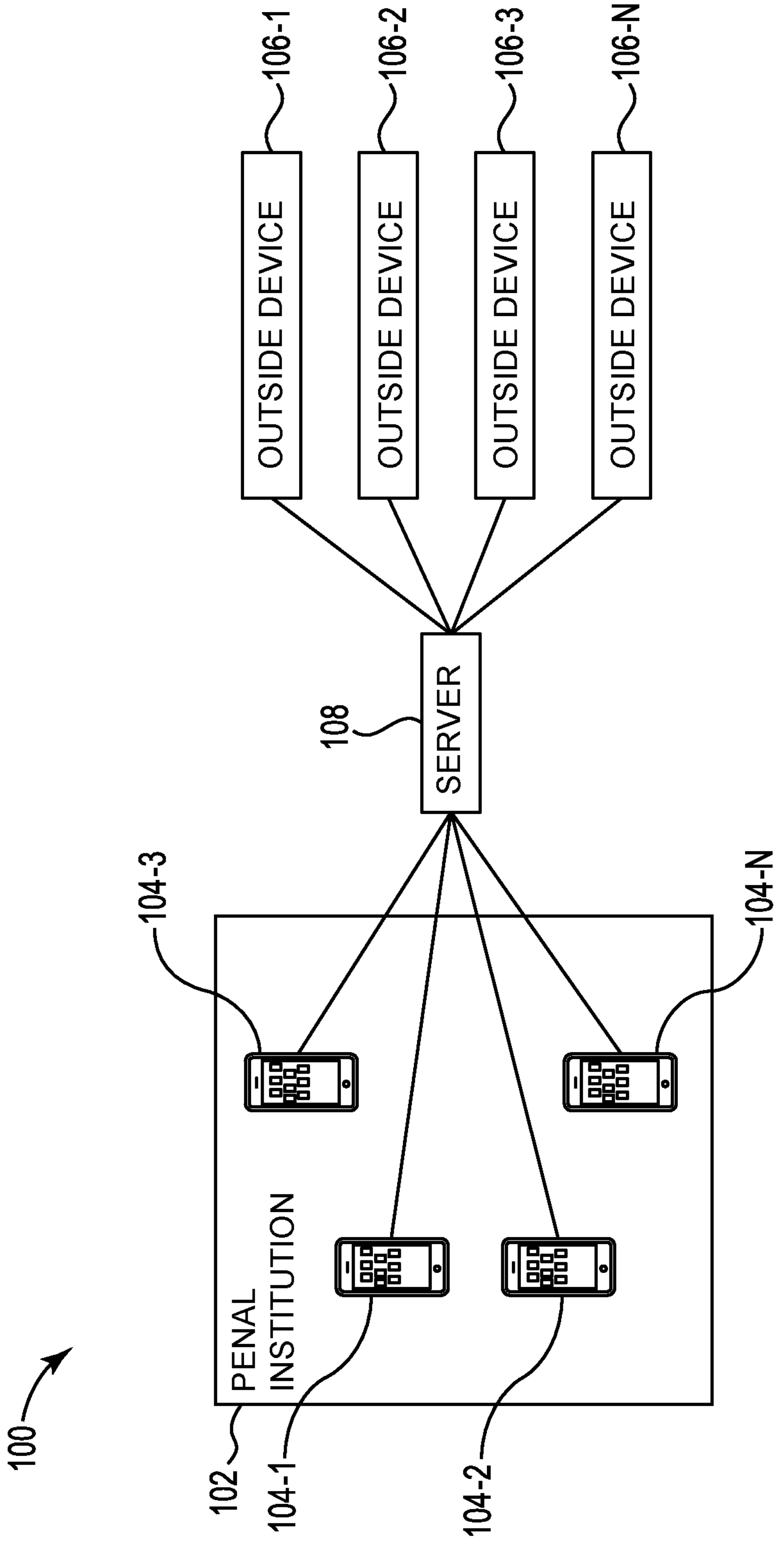
FIG. 1 illustrates an example of an inmate information communication system suitable for communications direct to inmates consistent with the disclosure.

Penal institutions such as incarceration facilities and correctional facilities refer to locations (e.g., prisons and/or jails) that house inmates. An inmate refers to an incarcerated person, for instance, those in an a jail or other type of penal institution.

Penal institutions can permit communication between inmates and customers. As used herein, a customer can refer to a family member, significant other, friend, and/or legal representative of an inmate that communicates with an inmate, among other types of customers that may communicate with the inmate. Such communications can occur in person when a customer visits an inmate at a penal institution or can occur remotely via telephone, electronic mail (email), electronic messaging (e.g., a text messages such as SMS message, etc.) or other mechanisms.

Allowing communication between inmates and outside devices such as outside devices associated with customers can be desirable for penal institutions. For instance, allowing communication between an inmate and a customer may promote good behavior by the inmate from the perspective of the penal institution. However, allowing an inmate to communicate with customers in some circumstances may be detrimental, such as when an inmate may be furthering criminal activity by communicating with a customer. Thus, it can be desirable to provide an inmate with a way to communicate with customers while discouraging criminal activity. For instance, providing inmates access to telephones and/or electronic mail can allow an inmate to communicate with a customer while allowing, when legally permissible, penal institution staff, law enforcement, and/or legal counsel, among others, to monitor (e.g., real-time monitoring), record, and/or review those communications. However, inmate access to these methods of communication may be limited, for instance, by a duration of time, as other inmates may be waiting to use telephones or email. Further, an inmate may not have their desired level of privacy as other inmates may be in proximity to devices such as telephones or computers (e.g., to use email on a computer) in a common area.

It can be desirable to permit communication between an inmate in an incarceration facility and an outside device such as an outside device of an attorney that is located outside of a penal institutions. Yet, the attorney may be relative occupied during a typically work day, may be subject to a variable work schedule (e.g., due to changes in court filing deadlines, etc.), and/or may be otherwise be largely unable to answer unscheduled phone calls (e.g., unscheduled phone calls from the inmate). Conversely, inmates may be largely available during the day to answer telephone calls. Accordingly, it may be desirably for the attorney or other staff associated with the attorney to initiate an inbound communication request to an inmate as the schedule of the attorney permits. Additionally, in some instances penal institutions may employ shared or common telephones and/or computers. In such cases, an attorney may not be able to directly voice call or video call an inmate (e.g., at an unscheduled time and/or in the case of an urgent event). Moreover, some previous approaches may associate a fee with all calls, even call to a public defender or other pro-bono attorney representing an inmate. Yet, the approaches herein may be configured to permit establishment of free communications between a wireless inmate device and an outside device such as those associated with a public defender.

Moreover, it can be desirable to permit an inmate access to various educational/support materials such as educational/trade materials, mental health support, and/or other types of materials that can improve a quality of life of a given inmate. However, making physical copies of such materials accessible to inmates can pose health/safety concerns and/or impart logistical difficulties, for instance, to ensure that a given inmate has access to relevant educational/support materials.

As such, examples of the present disclosure provide communications direct to inmates, as is described herein. An inmate can, for example, be assigned a wireless inmate device with direct voice communication capabilities. The inmate may carry the wireless inmate device with them during certain times of the day, and may communicate (e.g., send and/or receive) voice communications via a Wi-Fi radio included in the wireless inmate device at their leisure. Where permissible, recordings and/or transcripts of the voice communications may be reviewable by incarceration facility staff, law enforcement, and/or legal counsel, among others. In this manner, voice communication via Wi-Fi radio can provide inmates with a way to communicate with outside devices (e.g., with registered outside devices of customers and/or with unregistered outside devices of other individuals located outside of the incarceration facility) as directed by the outside parties (e.g., responsive to an incoming call placed by the outside party), while maintaining a degree of privacy from other inmates, which can promote positive inmate behavior. The wireless inmate device may be a registered device that is registered with an entity associated with the incarceration facility.

For instance, audio communication direct to inmates may be authorized (e.g., by the entity that provisions the one or more incarceration facilities with the wireless inmate devices) when a telephone number associated with the outside device is present in the contact list associated with the wireless inmate device, among other possibilities (e.g., depending on a time of day, an account balance associated with a wireless inmate device, etc.). For example, the audio communications may be automatically authorized by the entity that provisions the one or more incarceration facilities with the wireless inmate devices when a telephone number associated with the outside device is present in the contact list associated with the wireless inmate device, among other possibilities depending on a time of day, an account balance associated with a wireless inmate device. The automatic authorization refers to authorization that does not include any manual interactions or manual (e.g., human inputs).

Thus, unlike some other approaches that are reliant on manual inputs (e.g., case by case evaluation of inbound communication requests by an individual at or associated with an incarceration facility), the approaches herein may timely and directly route inbound communications in an automatic manner to a wireless inmate device. Yet, such approaches at least due to the automatic verification of information (e.g., verification that the telephone number associated with the outside device is present in the contact list associated with the wireless inmate device) associated with an inbound audio communication request may ensure that inmate privacy is maintained, may minimize any nefarious interactions, and/or may otherwise promote safety and security in the context of an incarceration facility. Moreover, in some instances, the approaches herein may permit a secondary (e.g., subsequent) authorization to be performed via a user interface of a wireless inmate device. That is, such approaches may permit an inmate assigned an inmate device that is an intended recipient of an inbound communication request to authorize or decline the inbound communication request. Such approaches may provide an inmate associated with the wireless inmate device a degree of autonomy and control over communications that is not typically afforded to an inmate and thereby may promote can promote positive inmate behavior.

Further, the systems and methods herein may permit readily resolving issues and further promotion of positive inmate behavior by maintaining and providing an accurate recording of all communications (e.g., video, text/written communications, etc.) between inmate communication devices and outside devices, when legally permissible. For instance, each of the wireless inmate devices can be configured to record video, audio, text, etc. In this way, both inmates and officers can be protected by virtue of having recorded video/conversations for later review. Each of a plurality of different types of communication is recorded. For example, each of the wireless inmate devices is configured to provide a log of instances of various types of communication (i.e., communication modes) and content (text, audio, and/or video) of any instances of a type of communication is recorded. However, it is noted that some communications may not be recorded. For instance, privileged communications between an inmate and an attorney representing the inmate are not recorded. For example, telephone numbers or other contact information associated with attorneys representing inmates may be stored (e.g., in a server or otherwise). As such, any communication sessions with a wireless inmate device and an outside device having a telephone numbers that is associated with the attorney may not be recorded.

FIG. 1 illustrates an example of an inmate information communication system 100 consistent with the disclosure. As shown in FIG. 1, the system 100 can be deployed in a penal institution 102 and can include wireless inmate devices 104-1, 104-2, 104-3, . . . , 104-N (referred to collectively as wireless inmate devices 104), one or more outside devices 106-1, 106-2, 106-3, . . . , 106-N (referred to collectively as outside devices 106), and a server 108. The system 100 can include additional components and/or can be coupled to the internet. For instance, a given quantity of the wireless inmate devices 104 and/or the outside devices 106 can be increased or decreased from the quantities illustrated in the system 100 of FIG. 1.

Server 108 may be a web server, a cloud server, and/or other type of server. The server 108 can include various types of hardware to perform aspects herein. The wireless inmate devices 104 may be tablet computing devices. For instance, the wireless inmate devices 104 can be tablets that are enclosed in a corrections grade enclosure. Examples of suitable wireless inmate devices enclosed in a corrections grade enclosures include those described in U.S. Pat. No. 10,082,835, the entire contents of which is incorporated by reference. Wireless inmate devices can display content specific to wireless inmate devices generally, content specific to an inmate assigned the wireless inmate device, or both. For instance, a wireless inmate device assigned to and accessible only by a respective inmate can be configured for the respective inmate (e.g., display a name, list of contacts, types of permitted communications, any open tickets/grievances, account information, etc. that is specific to the respective inmate).

Wireless inmate devices 104, such as wireless inmate device 104-1, can display a keyboard on a user interface of the wireless inmate device 104-1. For example, wireless inmate device 104-1 can display a QWERTY keyboard such that a user of wireless inmate device 104-1 can input text or other inputs to wireless inmate device 104-1. As used herein, a QWERTY keyboard refers to a keyboard layout in which the first six keys of the top left letter row are QWERTY. Although wireless inmate devices 104 are described as displaying a QWERTY keyboard, examples of the disclosure are not so limited. For example, wireless inmate device 104 can display any other keyboard layout.

Wireless inmate devices 104 represent electronic devices that can generate and/or receive electronic data and/or facilitate communication via Wi-Fi radio, among other capabilities. Examples of wireless inmate devices 104 can include wireless inmate devices including a capability to wirelessly transmit data, such as voice calls, video calls, emails, text messages, via a Wi-Fi radio. Each wireless inmate device 104 can include a Wi-Fi radio. As used herein, the term "Wi-Fi radio" can, for example, refer to a radio including an antenna capable of transmitting and/or receiving data according to the Institute of Electrical and Electronics Engineers (IEEE) 802.11 standard. As used herein, the term "antenna" can, for example, refer to a device that converts electric power into radio waves, and/or vice versa.

Notably, the wireless inmate devices 104 may be configured to receive an inbound communication request. As used herein, an inbound communication request refers to a communication request initiated from an outside device that is located outside of an incarceration facility. Being located outside of an incarceration facility refers to be located at a different location than a location of the incarceration facility. Conversely, being located inside of an incarceration facility refers to be located at the same physical location (e.g., within a building or on an exterior grounds of) as the incarceration facility. That is, the outside device may be located outside of an incarceration facility and the wireless inmate device may be located inside of the incarceration facility.

For instance, the inbound communication request may be an audio communication request initiated from an outside device to a particular telephone number assigned to a wireless inmate device that is located inside of the incarceration facility. The inbound audio communication requests may be authorized or may be prohibited, as detailed herein. In some cases, the inbound communication requests can be authorized or prohibited by a representative (e.g., administrator at an incarceration facility), an entity that provisions one or more incarceration facilities with wireless inmate device, an inmate assigned to a wireless inmate device that is a recipient of an audio communication request, or any combination thereof. That is, in some instances the incarceration facility and/or the entity that provisions the incarceration facility may have sole control of whether or not the inbound communication requests are prohibited or are authorized, as detailed herein.

However, in some instances, there may be a multi-stage process for authorizing or prohibiting inbound communication requests. For instance, an entity that provisions one or more incarceration facilities with wireless inmate device may initially authorize or prohibit an inbound communication to a particular wireless inmate device. Responsive to an initial authorization of the inbound communication by the entity, an authorization prompt may be displayed via a user interface of the wireless inmate device (e.g., which is the intended recipient of the inbound communication request). The authorization prompt may be configured (e.g., with selectable icons, etc.) permit an inmate associated with the wireless inmate device to perform an secondary authorization or prohibit a communication session from being established responsive to the inbound communication request, as detailed herein. Information (e.g., a date, time, numbers of a requesting outside device, etc.) associated with inbound communications requests that are prohibited or declined (e.g., by the inmate) can be saved in a server.

A mentioned, wireless inmate devices 104 can communicate with outside devices 106 via the Wi-Fi radios of each of the wireless inmate devices 104. For instance, a given wireless inmate of the given wireless inmate devices 104 may communicate via an audio call and/or a video call with the a given outside device of the outside devices 106 once a communication session is authorized between the given wireless inmate device and the given outside device. While generally described in terms of audio communications, the disclosure is not so limited. Rather, in some instances, the wireless inmate devices 104 can communicate text messages, emails, or other types of communications with the outside devices 106. For instance, the wireless inmate devices 104 can be authorized to communicate text messages with the outside devices responsive to an inbound text message which is authorized by the server 108. A text message can include a short message service (SMS) message and/or a multimedia messaging service (MMS) message. As used herein, the term "SMS message" can, for example, refer to a text messaging service component using standardized communication protocols to enable text messages to be sent and/or received between devices. As used herein, the term "MMS message" can, for example, refer to a text messaging service component using standardized communication protocols to enable text messages that may include media content to be sent and/or received between devices.

As used herein, the term "outside device" can, for example, refer to a device including a processing resource, memory, and input/output interfaces for wired and/or wireless communication. For example, an outside device may be a mobile device such as a laptop computer, a desktop computer, a phone (e.g., a smart phone), an analog phone such a plain old telephone service (POTS), a tablet, a personal digital assistant (PDA), smart glasses, and/or a wrist-worn device (e.g., a smart watch), among other types of mobile devices, although examples of the disclosure are not limited to such devices.

An inmate can request an wireless inmate device 104 from, for example, incarceration facility staff. An inmate may be assigned an wireless inmate device 104. In order to receive the wireless inmate device 104, an inmate may have to agree to a user agreement. The user agreement can set conditions for use of wireless inmate device 104 by an inmate, including text communication limitations, funding agreements, and/or legal disclaimers.

Incarceration facility staff may input information about the inmate and/or the wireless inmate device 104 into server 108 in response to the inmate being assigned an wireless inmate device 104. For example, inmate information and/or wireless inmate device information can be stored in server 108, as is further described herein.

An inmate may be prevented from receiving an wireless inmate device 104. For example, an inmate who may have destroyed or caused an wireless inmate device 104 to be destroyed can be prevented from receiving another wireless inmate device 104. The inmate can be stored on a list of inmates not allowed to be issued wireless inmate devices 104. The list may be stored on the server 108 or otherwise stored.

The Wi-Fi radio of each wireless inmate device 104 can be associated with an active predetermined and unique telephone number selected from a group of reserved predetermined and unique telephone numbers. For example, a group of telephone numbers may be reserved such that they may be assigned to wireless inmate devices 104, where the wireless inmate devices 104 are assigned to inmates at the penal institution 102.

Each respective telephone number of the group of reserved predetermined and unique telephone numbers can be a North American Numbering Plan number. The Wi-Fi radio of each wireless inmate device 104 can be associated with unique telephone numbers that can include a numbering plan area code, central office exchange code, and a subscriber number. For example, the Wi-Fi radio of wireless inmate device 104-1 can have an active predetermined and unique telephone number that is 999-555-1001, and the Wi-Fi radio of wireless inmate device 104-2 can have an active predetermined and unique telephone number that is 999-555-1515.

The group of reserved predetermined and unique telephone numbers can include a numbering plan area code associated with an area including the penal institution 102. For example, the area code of the group of reserved predetermined and unique telephone numbers can be an area code associated with a geographic area including the penal institution 102. As an example, each respective telephone number included in the group of reserved predetermined and unique telephone numbers can include the area code "999".

The active predetermined and unique telephone number of each wireless inmate device 104 can be associated with a user of each wireless inmate device 104. That is, wireless inmate devices 104 can be assigned to inmates, and an active predetermined and unique telephone number of each assigned wireless inmate device 104 can be associated with an inmate assigned the specific wireless inmate device 104. For example, inmate "John Doe" may be assigned wireless inmate device 104-1, where the Wi-Fi radio of wireless inmate device 104-1 is associated with the active predetermined and unique telephone number 999-555-1001. Using this active predetermined and unique telephone number, a customer utilizing an outside device such as the outside device 106-1 (e.g., a mobile phone, tablet, etc.) can send an inbound communication request to 999-555-1001, and inmate "John Doe" may be permitted to communicate with the outside device responsive to authorization of the inbound communication request, as is further described herein.

In some examples, the wireless inmate devices 104 do not include a cellular radio. Stated differently, each of the wireless inmate devices 104 does not include a cellular radio. As used herein, the term "cellular radio" can, for example, refer to a radio including an antenna capable of transmitting and/or receiving data according to standards for cellular networks, such as Global System for Mobile Communications (GSM) standards and/or Code division multiple access (CDMA) standards, among other standards for cellular networks. For example, wireless inmate devices 104 do not include a cellular radio and as such, are not able to communicate on GSM or CDMA cellular networks, among other types of cellular networks. The lack of a cellular radio may be desirable to prohibit an inmate from making a telephone call and/or sending text messages via a GSM and/or CDMA cellular network.

An AP can refer to a networking device that allows a wireless inmate device to connect to a wired or wireless network. As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless inmate devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and/or Flash memory.

As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

The wireless inmate devices 104 can communicate via the Wi-Fi radio of the wireless inmate devices 104 with outside devices 106 utilizing an AP and a WLAN of penal institution 102. That is, the Wi-Fi radio of wireless inmate devices 104 can communicate audio, video, and/or text messages through the AP and WLAN of penal institution 102, via server 108, with outside devices 106.

Although server 108 is shown in FIG. 1 as being remote from penal institution 102, examples of the disclosure are not so limited. For example, server 108 can be located at penal institution 102.

Server 108 can prevent communication of between a wireless inmate device and an outside device in response to identifying information such as a telephone number of the outside device 106 being included in a list of restricted outside devices. That is, the wireless inmate device 104 may be restricted from establishing communicating sessions with certain outside devices. In some examples, an inmate may be restricted from communicating with outside devices of witnesses, victims, opposing legal counsel, and/or judges, among others.

Server 108 may store a list of restricted outside devices. The list can include telephone numbers associated with restricted outside devices. For example, if an inbound communication request is associated with an outside device in the restricted list of outside devices, server 108 can prevent establishment of a communication session with the outside device if information (e.g., a name, a phone number, etc.) associated with the outside device is included in the list of restricted outside devices.

Server 108 can store communication information corresponding to communication sessions established between wireless inmate devices 104 and outside devices. Communication information can include, but is not limited to, inmate information such as an inmate's name, jail identification number, and/or date of birth, wireless inmate device information such as the wireless inmate device identification number, the active predetermined and unique telephone number of the wireless inmate device 104, and/or the device password selected by the inmate, account funding information such as account balance and/or how the account balance was funded (e.g., funding transactions), and/or a recording/transcript of an audio communication, etc. Communication information may be stored for a predetermined and/or configurable length of time. Communication information may be reviewed by incarceration facility staff, law enforcement, and/or legal counsel, among others, where applicable and/or legally permissible. For example, communication information stored on server 108 may be searchable and/or the communication may be exportable. The communication information may be used as investigatory and/or evidentiary material, among other purposes.

Server 108 can prevent some or all of wireless inmate devices 104 from communicating with (e.g., does not authorize communication session with) outside devices at a predetermined or scheduled times such as during inmate transfers, at night, etc.

Server 108 can monitor (e.g., real-time monitoring) and/or log usage information of wireless inmate devices 104. For instance, each wireless inmate device 104 may be assigned an equipment number, and server 108 can monitor and/or log usage information of each wireless inmate device 104 based on the wireless inmate device equipment numbers. For example, server 108 can monitor and/or log battery levels of each wireless inmate device 104. In an example in which server 108 is unable to monitor and/or log usage information of wireless inmate device 104-1, incarceration facility staff or others may be able to determine whether the battery of wireless inmate device 104-1 has been discharged, or if wireless inmate device 104-1 has been taken off the premises of penal institution 102. In some instances, audio communications can be monitored in real-time (e.g., live monitoring). For instance, the server 108 can monitor audio communications in real-time.

Wireless inmate devices 104 can operate in a single application mode when communicating via the Wi-Fi radio. As used herein, the term “single application mode” can, for example, refer to a mode of operation of wireless inmate devices 104 in which interaction and control of functions of wireless inmate devices 104 other than communication with outside devices are disabled. That is, wireless inmate devices 104 may be restricted to communication with outside devices (e.g., when communication sessions are authorized), in some instances. For instance, a given wireless inmate devices 104 may be prohibited from communication with any other wireless inmate device 104.

Wireless inmate device 104 can communicate with an outside device in response to an account associated with the wireless inmate device 104 having a sufficient monetary balance. That is, there can be a monetary cost associated with each communication session (e.g., each audio communication session) that is established between an outside device and an inmate device. When an inmate is assigned an wireless inmate device 104 (e.g., wireless inmate device 104-1), an account is associated with the wireless inmate device 104 is linked to an active predetermined and unique telephone number. Each wireless inmate device 104 can have an account associated with the wireless inmate device 104 that may be funded by various mechanisms so that an inmate can communicate with outside devices, as is described herein. If there is an insufficient monetary balance in an account associated with an wireless inmate device 104, the wireless inmate device 104 may be prohibited from establishing a communication session with an outside device.

An account associated with an wireless inmate device 104 may be funded by receiving, via a user interface of the wireless inmate device 104, funding via a funding mechanism. For example, an inmate or an outside entity such as a customer may purchase a telephone card, and may input payment information from the telephone card into wireless inmate device 104-1 via the user interface of wireless inmate device 104-1 to fund the account associated with wireless inmate device 104-1. As used herein, the term “telephone card” can, for example, refer to a card having a monetary stored-value system, which can be accessible via an access telephone number and a personal identification number (PIN), where the card may or may not be a physical card.

An account associated with an wireless inmate device 104 may be funded by communicating, via a Wi-Fi radio of an wireless inmate device 104, a predefined funding request such as a text message and/or a decline notification include the predefined funding request to an outside device 106. The predefined funding request can be a preprogrammed text message or similar information (e.g., a voice call and/or voice message) that can be sent to an outside device 106 such as an outside device of a customer, where the predefined funding request can direct the customer to a web site (e.g., via a web link or other information such as an audio communication included in a voice call and/or voice message) to fund the account associated with the wireless inmate device 104 sending the predefined funding request. As an example, a predefined funding request may recite or state, “An account associated with inmate John Doe is out of funds. Please visit [web link] to fund the account associated with John Doe’s wireless inmate device. Demo County Jail.” At the website associated with the web link, the outside entity can select an inmate account that the outside entity wants to fund. Once an outside entity such as a customer has funded the account associated with the wireless inmate device 104, the inmate may be able to establish communications sessions and communicate with outside devices. In some instances, a prompt can be displayed on the wireless inmate device prior to establishing and/or during the communication session. The prompt can include various information such as incarceration facility guidelines and/or conduct requirements (e.g., prohibitions against nudity and/or other inappropriate behavior, etc.).

Figure 2:
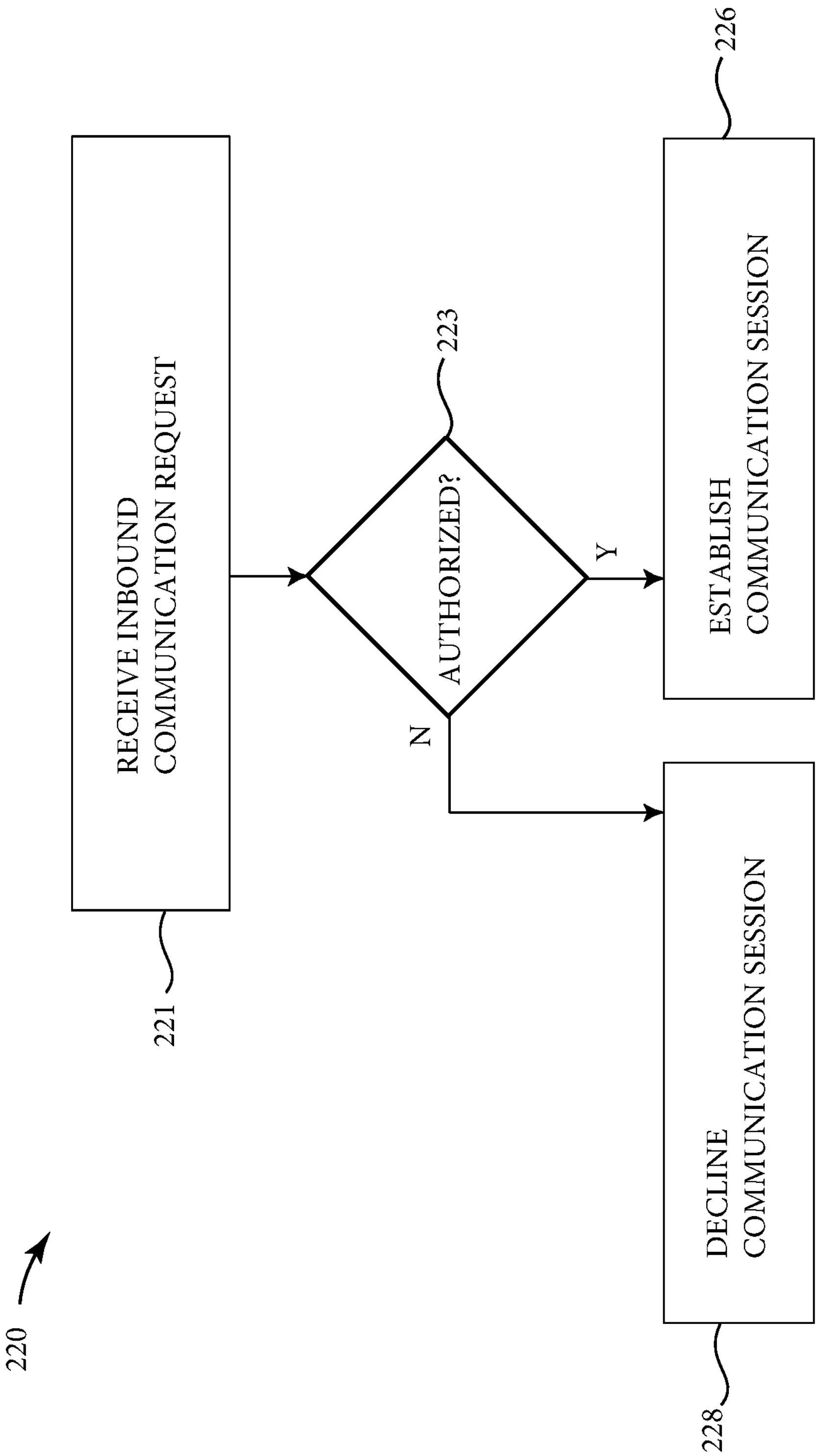
FIG. 2 illustrates an example flow diagram for communications direct to inmates consistent with the disclosure.

FIG. 2 illustrates an example flow diagram 220 for communications direct to inmates consistent with the disclosure. In some instances, an inbound communication request can be received, as indicated at 221. The inbound communication request can be a communication request to the unique telephone number associated with the wireless inmate device. For instance, a server (e.g., the server 108 as illustrated in FIG. 1) or other type of computing device can receive the inbound communication request. The server or other type of computing device may be under that control of an incarceration facility and/or an entity associated with the incarceration facility. For instance, the entity associated with the incarceration facility may be an entity that provisions the incarceration facility with the wireless inmate devices.

In some instances, the inbound communication request may be an inbound audio communication request such as a voice communication request or a video communication request. For example, the inbound communication request may be a voice communication request. However, in some examples, the inbound communication request may a video communication request that includes both a video and an audio component. While generally described herein as relating to inbound audio communication requests, the disclosure is not so limited. Rather in some instances that inbound communication request may be an inbound text communication, an inbound email communication request, etc.

In some examples, the inbound communication request may be received via a Voice over Internet Protocol (VOIP) connection, via a public switched telephone network (PSTN), or both. For instance, the inbound communication request may be received at via a VOIP connection at a server such as a VOIP server, among other possibilities. In some examples, the inbound communication request may be initiated from a cellular radio, from a Wi-Fi radio, or both, of the outside device.

At 223, the inbound communication request may be authorized. Such authorization ensures that communication session are only established with authorized entities (e.g., authorized outside devices). That is, the inbound communication request may be authorized prior to establishing a communication session. As detailed herein, the inbound communication request may be authorized by a server, by the wireless inmate device (e.g., to which the inbound communication request is directed), or both. For instance, in some examples the inbound communication request may be authorized at least by the server or other computing device under the control of an incarceration facility and/or an entity associated with the incarceration facility such as an entity that provisions the incarceration facility with the wireless inmate devices.

Authorization of the communication request may occur automatically (in the absence of a manual action taken to authorize and/or determine whether to authorize the audio communication). For instance, an inbound communication request may be authorized automatically by the server or other computing device under the control of an incarceration facility and/or an entity associated with the incarceration facility such as an entity that provisions the incarceration facility with the wireless inmate devices. For example, the server may automatically authorize the inbound communication based on status information associated with the wireless inmate device (e.g., in wireless communication device which is the intended recipient of the inbound communication). Examples of status information include a time of day, a day of the week, an account balance associated with the wireless inmate device, a contact list associated with the wireless inmate device, or any combination thereof. For instance, the server may be configured to automatically authorize in the inbound communication when (e.g., only when) a telephone number and/or a name associated with of the outside device is present in the contact list associated with the wireless inmate device. For example, when a telephone number of the outside device is present in the contact list associated with the wireless inmate device the server or other computing device may automatically authorize the inbound communication request.

In some instances, each inbound communication request may be required to be authorized (e.g., by the server, by a user of the wireless inmate device that is the intended recipient of the inbound communication request, or both) prior to establishing a communication session between an given outside device and a given wireless inmate device. Requiring authorization of the inbound communication request responsive to each inbound communication request can ensure that any resulting communication sessions are only established as is permissible by the incarceration facility and/or an entity associated with the incarceration facility. Additionally, in instances employing authorization by the user of the wireless inmate device that is the intended recipient of the inbound communication request, requiring authorization of each inbound communication request can mitigate or eliminate any unwanted charges to an account associated with the inmate and/or otherwise promote autonomy and good behavior of the inmate.

Responsive to authorization of the inbound communication request, the flow may proceed to 226. At 226, a communication session may be established between the wireless inmate device and the outside device (e.g., the same outside device that initiated the inbound communication request). For instance, an audio communication session such as a voice call or a video call may be established between the wireless inmate device and the outside device. Thus, the approaches herein can permit direct communication with inmates, and yet at least due to the authorization of the inbound communications requests prior to establishing a communication session can ensure that communication session are only established with authorized entities. While FIG. 2 indicates that the communication session is established responsive to authorization of the inbound communication request by the server, in some instances a secondary or subsequent authorization may be required prior to establishing the communication session, for instance as described with respect to FIG. 3.

In some instances, the inbound communication request may be declined (e.g., is not authorized). That is, the inbound communication request may be declined and in response a communication session is not established between the outside device (e.g., the requesting device) and the wireless inmate device (e.g., the intended recipient of the communication request). As detailed herein, the inbound communication request may be declined by a server, by the wireless inmate device (e.g., to which the inbound communication request is directed), or both. For instance, in some examples the inbound communication request may be declined by the server or other computing device under the control of an incarceration facility and/or an entity associated with the incarceration facility such as an entity that provisions the incarceration facility with the wireless inmate devices.

Declining the communication request may occur automatically (in the absence of a manual action). For instance, the communication request may be declined automatically by the server or other computing device under the control of an incarceration facility and/or an entity associated with the incarceration facility such as an entity that provisions the incarceration facility with the wireless inmate devices. For example, the server may automatically decline the inbound communication based on status information associated with the wireless inmate device. As mentioned, examples of status information include a time of day, a day of the week, an account balance associated with the wireless inmate device, a contact list associated with the wireless inmate device, or any combination thereof. For instance, the server may be configured to automatically decline the inbound communication when a telephone number and/or a name associated with of the outside device is absent (e.g., is not present) in the contact list associated with the wireless inmate device and/or when a communication status associated with the wireless inmate device is set to prohibit communications. A communication status associated with the wireless inmate device may be set to prohibit communications when a balance of an inmate account associated with the wireless inmate devices is below threshold amount (e.g., has insufficient funds to pay for a communication session that would be established responsive to the incoming communication request and/or when the inbound communication request is received at a time when communications with outside devices are not permitted in a given incarceration facility, among other possibilities.)

Responsive to declining the inbound communication request, the flow may proceed to 228. At 228, the inbound communication request to establish the communication session between the requesting outside device and the wireless inmate device may be declined. Response to declining to establish a communication session responsive to the inbound communication request, a decline notification can be provided. For instance, the server may be configured to provide a decline notification to the wireless inmate device, the incarceration facility, or both, responsive to declining to establish the communication session between the wireless inmate device and an outside device. For instance, the decline notification may be provided to an outside device (e.g., the outside device that initiated the communication request).

The decline notification can indicate (e.g., via text, etc.) that the inbound communication request has been prohibited and/or declined. In some instances, the decline notification can include an indication or rational for the basis of the inbound request communication being declined. For instance, the decline notification may include information conveying that the inbound communication request was made at a time/day at which communications between outside devices and the wireless inmate devices is not permitted. In some instances, the decline notification may include information conveying a balance of an inmate account includes insufficient funds (e.g., insufficient to cover the cost of a communication session between the wireless inmate device and the outside device). In such instances, the decline notification, if provided to an outside device, can include additional information such as a link or information sufficient to permit the individual associated with the outside device to contribute money to the inmate account. For example, a prompt or other information may be communicated to the outside device that affords the outside device an opportunity (e.g., provides a website link or other information) to pay for the audio communication between the wireless inmate device and the outside device. In response, the outside device may contribute additional funds to an inmate account. Subsequently, the outside device may initiate an additional inbound communication request which may be authorized (e.g., in view of the presence of additional funds in the inmate account).

Figure 3:
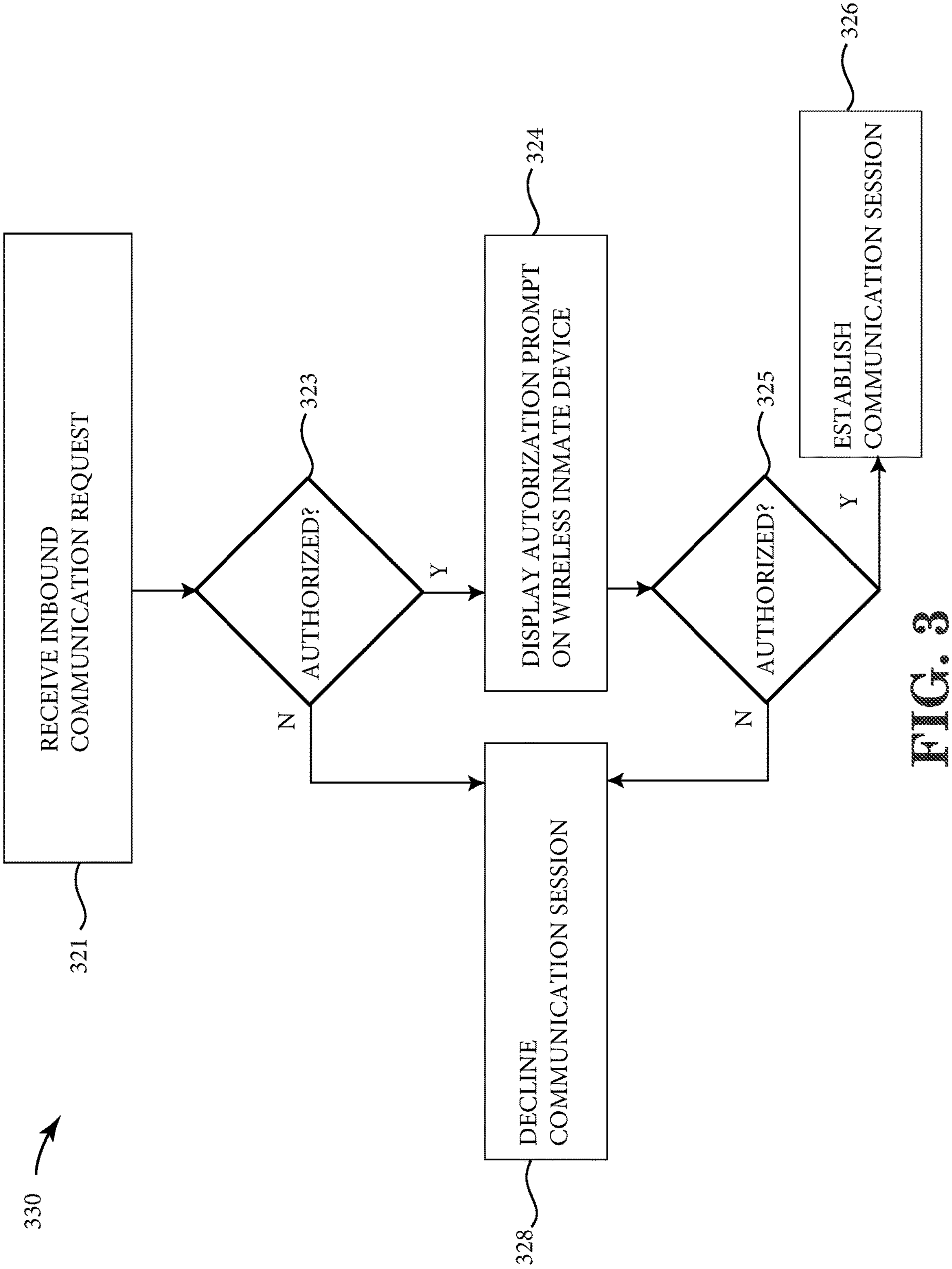
FIG. 3 illustrates another example flow diagram for communications direct to inmates consistent with the disclosure.

For instance, FIG. 3 illustrates another example flow diagram 330 for communications direct to inmates consistent with the disclosure. At 321, the flow diagram can include receipt of an inbound communication request to the unique telephone number associated with the wireless inmate device. The inbound communication request can be sent from an outside device that is located outside of the incarceration facility.

At 323, the inbound communication request may be authorized, as described herein. For instance, the inbound communication request may be authorized by the server or other computing device under the control of an incarceration facility and/or an entity associated with the incarceration facility such as an entity that provisions the incarceration facility with the wireless inmate devices.

Responsive to not authorizing (e.g., declining) the inbound communication request, the flow may proceed to 328. As mentioned, a decline notification can be provided to an outside device (e.g., the outside device that initiated the communication request) responsive to declining the inbound communication request.

Responsive to authorizing the inbound communication request, the flow may proceed to 324. That is, responsive to the initial authorization at 323, in some instances a prompt may be displayed via a user interface of the wireless inmate device. The prompt is configured to permit an inmate associated with the wireless inmate device to authorize or decline establishment of the audio communication between the wireless inmate device and the outside device. For instance, at 324, a prompt may displayed on the wireless inmate communication device that is the intended recipient of the inbound communication request.

Display of the prompt may permit an inmate associated with the wireless inmate device to make a selection (e.g., perform) an secondary authorization or decline (e.g., prohibit) a communication session from being established responsive to the inbound communication request. For instance, the prompt may indicate that an inbound communication request has been received and may convey information associated with the inbound communication request. Examples of information associated with the inbound communication request include identifying information associated with an outside device that initiated the incoming communication request, information about an individual associated with the outside device, and/or information about the inbound communication request itself. For instance, the prompt may include a type of the inbound communication request (e.g., a voice call or a video call, etc.), a name of the individual associated with the outside device, a location associated with the outside device, and/or a telephone number associated with the outside device. Based on the information in the prompt, the inmate associated with the wireless inmate device may elect to authorize a communication session with the outside device (e.g., authorize incurring charges associated with the communication session) or may elect to decline the communication session. For instance, a determination whether the secondary authorization is authorized is made at 325.

Responsive to the secondary authorization of the inbound communication request at 325, the flow may proceed to 326. At 326, a communication session may be established between the wireless inmate device and the outside device (e.g., the same outside device that initiated the inbound communication request).

Responsive to declining the inbound communication request at 325, the flow may proceed to 328. At 328, a decline notification can be provided to an outside device (e.g., the outside device that initiated the communication request, as described herein.

While generally described herein with respect to inbound communication requests, in some instances the wireless inmate devices may additionally be configured to provide outbound communication requests. In such instances, the outbound communication requests may be authorized (e.g., by a server or otherwise) based on a time of day, an inmate account balance, etc. in a similar manner as described with respect to the inbound communications.

Figure 4:
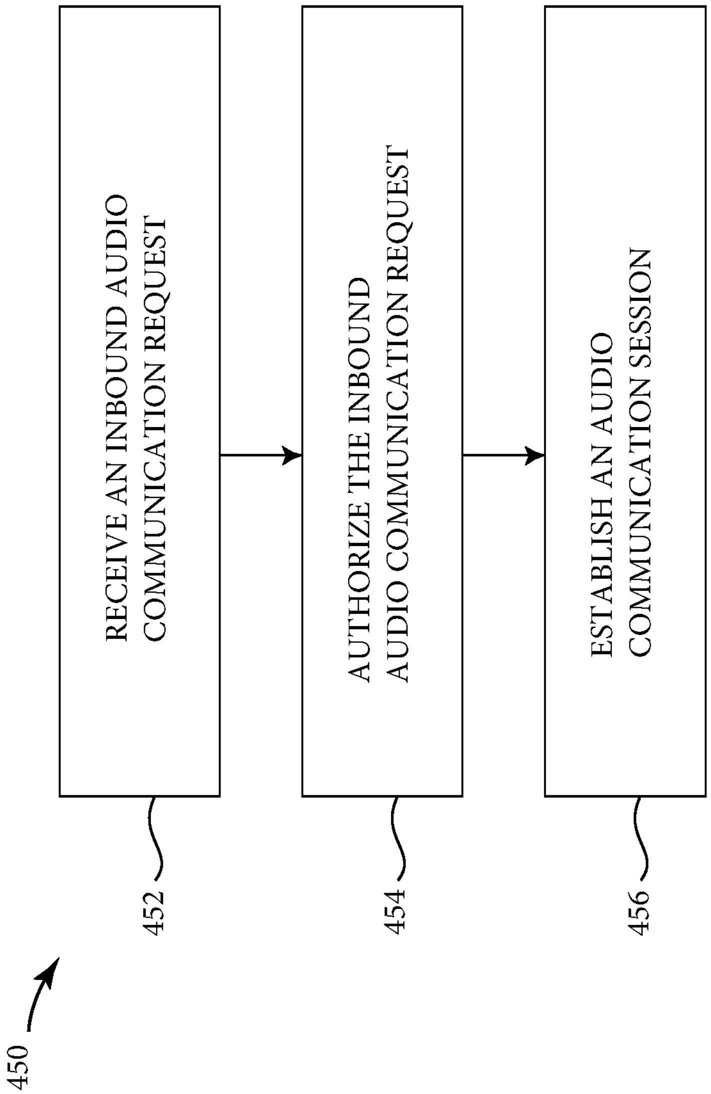
FIG. 4 illustrates an example of a method suitable for communications direct to inmates consistent with the disclosure.

FIG. 4 illustrates an example of a method 450 suitable for communications direct to inmates consistent with the disclosure. The methods described herein (e.g., with respect to FIG. 4) can be performed by processing logic that can include hardware (e.g., processing device, circuitry, dedicated logic, programmable logic, microcode, hardware of a unit, integrated circuit, etc.), software (e.g., instructions run or executed on a processing unit), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For example, aspects of the methods herein can be performed by a wireless inmate device, an access point, and/or a server.

At 452, the method can include receipt of a communication request initiated by an outside device, as described herein. At 454, the method 450 can include refraining from transmission of identifying information associated with the wireless inmate device. Examples of identifying information include a location and/or name of an inmate. For instance, the method 450 may include refraining from transmitting identifying information prior to establishing the audio communication session. Refraining from transmitting the identifying information (e.g., when the outside party is calling from an unregistered device that is therefore unknown of the inmate, the incarceration facility, and/or an entity associated with providing the wireless inmate devices to the incarceration facility/inmate) may protect the privacy of a particular inmate. For instance, some examples may refrain from transmission of identifying information associated with the wireless inmate device at least prior to establishing the audio communication between the wireless inmate device and the outside device. In some examples, identifying information is not transmitted responsive to the audio communication being prohibited and/or declined. Refraining from transmitting the identifying information can protect the privacy of a particular inmate (e.g., avoid disclosing the contact information to outside parties e.g., other than those that the inmate wishes to communicate with and/or is authorized to communicate with). For instance, in some case only the predetermined an unique telephone number may be communicated to the outside device (e.g., in the absence of any other identifying information such as a name and/or location of the inmate associated with the wireless inmate device and the predetermined and unique number thereof) prior to authorizing and establishing a communication session.

At 456, the method 450 can include establishing a communication session between the wireless inmate device and the outside device. For instance, the communication session may be established subsequent to authorization of the communication session by a server, the wireless inmate device, or both.

In some instances, the method 450 can include storing a transcript of the communication session (e.g., an audio communication session) between the wireless inmate device and the outside device, storing a recording (e.g., an recording of a real-time phone or video communication) of the communication session between the wireless inmate device and the outside device, or both. As mentioned, storing a transcript, recording, and/or otherwise maintaining a record of communication sessions between wireless inmate devices and outside devices, when legally permissible, can ensure the content of the communications sessions remains reviewable by incarceration facility staff, law enforcement, and/or legal counsel, among others during and subsequent to the actual communication sessions.

In some instances, the method 450 can include transmitting identifying information of the inmate to the outside device. For instance, the identifying information such as a name and/or location of the inmate may be transmitted to the outside device subsequent to authorizing and establishing the communication session between the wireless inmate device and the outside device. For example, a caller ID of the outside party may be presented with the identifying information of the inmate subsequent to establishing the communications session between the wireless inmate device and the outside device. Presenting the name of the inmate and/or an incarceration facility (e.g., jail) location may be presented to the outside caller to provide confirmation that the outside party is placing a call to the correct inmate. This may be helpful when outside caller is returning a call from an inmate.

Figure 5:
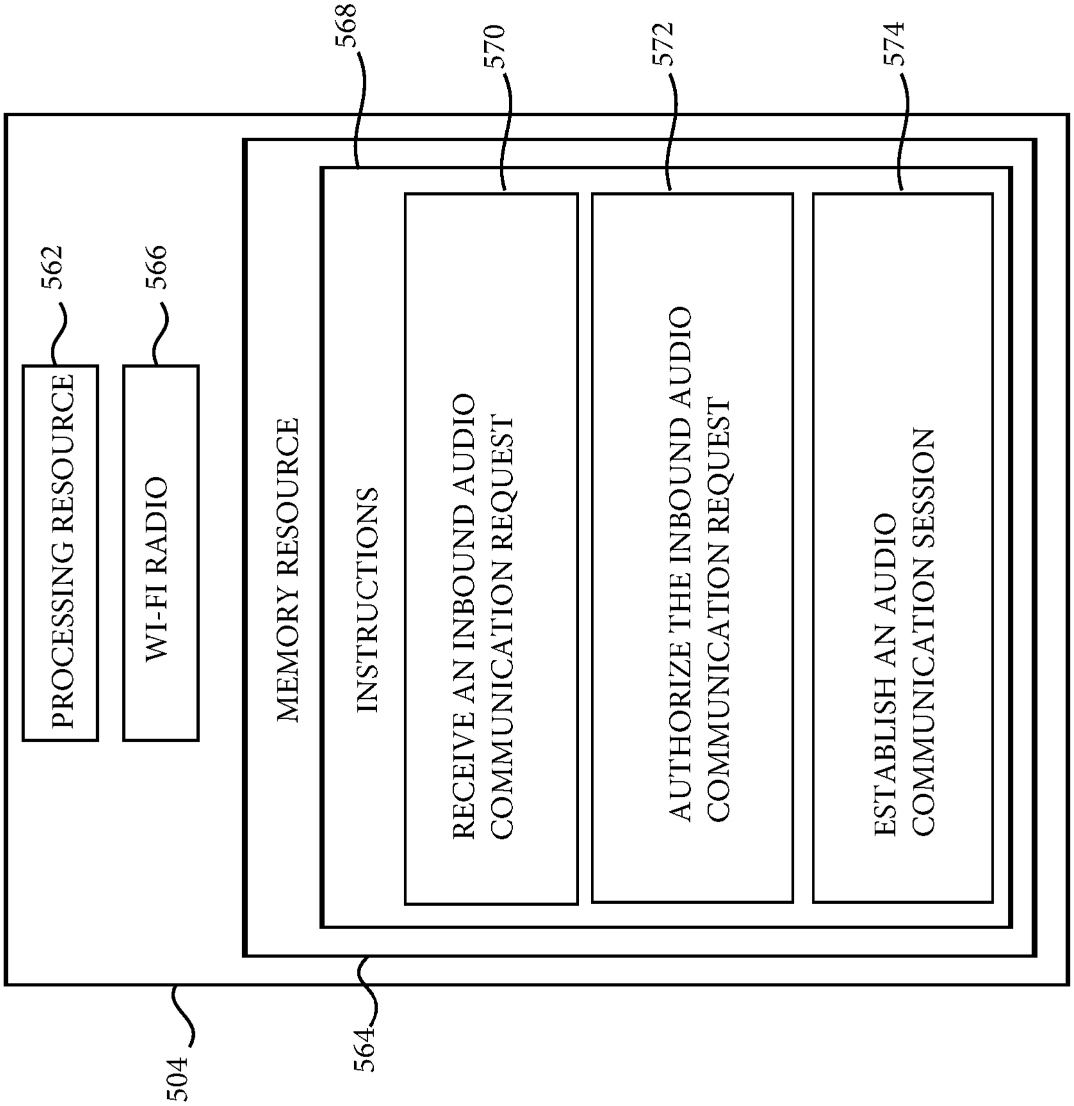
FIG. 5 illustrates a diagram of an example of a wireless inmate device suitable for communications direct to inmates consistent with the disclosure.

FIG. 5 illustrates a diagram of an example of a wireless inmate device 504 that is suitable for communications direct to inmates consistent with the disclosure. Wireless inmate device 504 can include a processing resource 562, a memory resource 564, and a Wi-Fi radio 566. Memory resource 564 can include machine-readable instructions, including instructions to the permit aspects of communications direct to inmates via a Wi-Fi radio of a wireless inmate device, as detailed herein.

Processing resource 562 may be a central processing unit (CPU), a semiconductor based microprocessor, and/or other hardware devices suitable for retrieval and execution of machine-readable instructions 568 stored in a memory resource 564. Processing resource 562 may fetch, decode, and execute instructions. As an alternative or in addition to retrieving and executing instructions 568, processing resource 562 may include a plurality of electronic circuits that include electronic components for performing the functionality of instructions 568.

Memory resource 564 may be any electronic, magnetic, optical, or other physical storage device that stores executable instructions 568 and/or data. Thus, memory resource 564 may be, for example, Random Access Memory (RAM), an Electrically-Erasable Programmable Read-Only Memory (EEPROM), a storage drive, an optical disc, and the like. Memory resource 564 may be disposed within a wireless inmate device 504, as shown in FIG. 5. Additionally and/or alternatively, memory resource 564 may be a portable, external or remote storage medium, for example, that allows wireless inmate device 504 to download the instructions 568 from the portable/external/remote storage medium.

Memory resource 564 can be a non-transitory machine-readable medium. A machine readable storage medium may be any electronic, magnetic, optical, or other physical storage device that stores executable instructions. Thus, machine readable storage medium may be, for example, Random Access Memory (RAM), an Electrically-Erasable Programmable Read-Only Memory (EEPROM), a storage drive, an optical disc, and the like. The executable instructions may be "installed" on the wireless inmate device 504 illustrated in FIG. 5. The machine readable storage medium may be a portable, external or remote storage medium, for example, that allows the wireless inmate device 504 to download the instructions from the portable/external/remote storage medium. In this situation, the executable instructions may be part of an "installation package". As described herein, the machine readable storage medium may be encoded with executable instructions related to communications direct to inmates.

For instance, the instructions 568 can include instructions 570 that are executable to receive an audio communication request initiated by an outside device to a predetermined and unique telephone number that is associated with a wireless inmate device that is assigned to an individual inmate in an incarceration facility, as detailed herein. The instructions 568 can include instructions 572 that are executable to authorize the audio communication request initiated from the outside device based on status information associated with the wireless inmate device. For instance, the instructions 572 may be executable to authorize the audio communication request initiated from the outside device based on status information associated with the wireless inmate device responsive to receipt of the audio communication request, as detailed herein.

The instructions 568 can include instructions 574 that are executable to establish an audio communication session between the wireless inmate device and the outside device. For instance, the instruction 574 can be executable to establish an audio communication session between the wireless inmate device and the outside device responsive to authorization of the audio communication request, as detailed herein.

Figure 6:
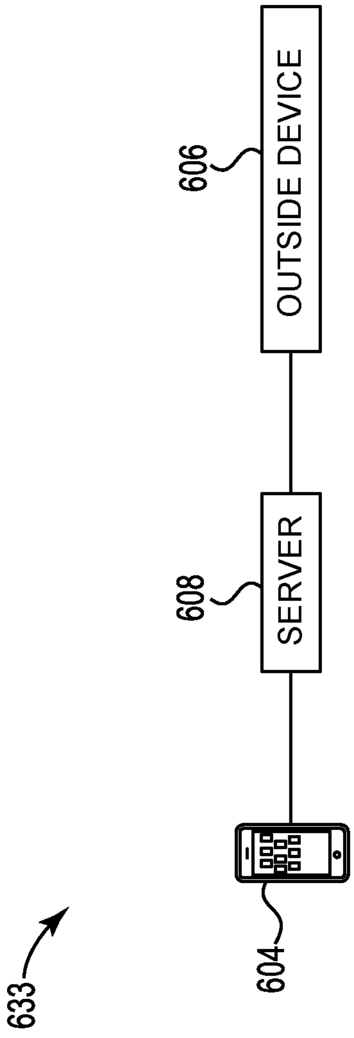
FIG. 6 illustrates an example of a system for communications direct to inmates consistent with the disclosure.

FIG. 6 illustrates an example of a system 633 for communications direct to inmates consistent with the disclosure. As shown in FIG. 6, the system 633 includes a wireless inmate device 604, an outside device 606, and a server 608. The wireless inmate device 604 can be analogous or similar to the wireless inmate devices 104, as previously described in connection with FIGS. 1, the outside device 606 can be analogous to the outside device 106, as previously described in connection with FIG. 1, and server 608 can be analogous to the server 108 as previously described in connection with FIG. 1.

As mentioned, the wireless inmate device 604 can include a Wi-Fi radio. The Wi-Fi radio can communicate through server 608 with the outside device 606 via the Wi-Fi radio. For example, wireless inmate device 604 can be configured to perform various aspects wherein such as participating in an audio communication session with the outside device 606. The audio communication session can be established by, transmitted through, and/or can be authorized by the server 608. The audio communication session may be manifested as a voice call and/or a video call, among other possibilities.

As used herein, "logic" is an alternative or additional processing resource to perform a particular action and/or element described herein. Logic can include hardware. The hardware can include processing resources such as circuitry, which are distinct from machine-readable instructions on a machine-readable media. Further, as used herein, "a" can refer to one or more such things.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An inmate information communication system, the system comprising:

a wireless inmate device including a Wi-Fi radio that is associated with a predetermined and unique telephone number, wherein the wireless inmate device is located inside of an incarceration facility;

a server configured to:

receive, from an unregistered outside device, an inbound audio communication request initiated by the unregistered outside device to the unique telephone number associated with the wireless inmate device, wherein the inbound audio communication request is a request to establish an audio and/or video communication session between the unregistered outside device and the wireless inmate device;

responsive to the receipt of the inbound audio communication request, automatically authorize the inbound audio communication request without manual intervention when a telephone number associated with the unregistered outside device is present in a list of telephone numbers associated with the wireless inmate device; and responsive at least to the authorization of the inbound audio communication request, establish the audio and/or video communication session between the wireless inmate device and the unregistered outside device, wherein audio and/or video communication between the wireless inmate device and the unregistered outside device occurs during the communication session.

2. The system of claim 1, wherein the authorization of the inbound communication request is provided by the server.

3. The system of claim 1, wherein the inbound communication request further comprises a real-time voice communication request or a real-time video communication request.

4. The system of claim 1, wherein the server is further configured to:

receive the inbound communication request via a Voice over Internet Protocol (VOIP) connection, via a public switched telephone network (PSTN), or both; and receive the inbound communication request initiated from a cellular radio, from the Wi-Fi radio, or both, of the unregistered outside device.

5. The system of claim 1, wherein the wireless inmate device does not include a cellular radio.

6. The system of claim 1, wherein the server is further configured to authorize the inbound communication request based on status information associated with the wireless inmate device, wherein the status information includes:

a time of day;

a day of a week;

an account balance associated with the wireless inmate device;

a contact list associated with the wireless inmate device; or any combination thereof.

7. The system of claim 6, wherein the server is configured to authorize the inbound communication request when a telephone number associated with the unregistered outside device is present in the contact list associated with the wireless inmate device.

8. The system of claim 1, wherein responsive to the server authorizing the inbound communication request, the wireless inmate device is configured to display an authorization prompt via a user interface of the wireless inmate device.

9. The system of claim 6, wherein the server is configured to prohibit the inbound communication request when a telephone number associated with the unregistered outside device is absent from the contact list associated with the wireless inmate device or a communication status associated with the wireless inmate device is set to prohibit establishment of a communication session responsive to the inbound communication request.

10. The system of claim 9, wherein responsive to the inbound communication request being prohibited, the server is configured to provide a notification to the wireless inmate device, the incarceration facility, or both.

11. A non-transitory machine-readable medium storing instructions executable by a processing resource to:

receive, from an unregistered outside device, an inbound audio communication request initiated by the unregistered outside device and directed at a wireless inmate device located inside of an incarceration facility, wherein the wireless inmate device includes a Wi-Fi radio that is associated with a predetermined and unique telephone number, and wherein the inbound audio communication request is a request to establish an audio communication session;

automatically authorize the audio communication request without manual intervention when a telephone number associated with the unregistered outside device is present in a contact list of telephone numbers associated with the wireless inmate device; and establish an audio communication session between the wireless inmate device and the unregistered outside device responsive to the automatic authorization of the audio communication request, wherein audio communication between the wireless inmate device and the unregistered outside device occurs during the audio communication session.

12. The medium of claim 11, further comprising instructions executable by the processing resource to transmit identifying information associated with the wireless inmate device responsive to establishing the audio communication session.

13. The medium of claim 11, further comprising instructions executable by the processing resource to refrain from transmission of identifying information associated with the wireless inmate device prior to establishing the audio communication session.

14. The medium of claim 11, further comprising instructions executable by the processing resource to refrain from transmission of identifying information associated with the wireless inmate device responsive to the audio communication request being prohibited or declined.

15. A method for communications direct to inmates, the method comprising:

receiving, by a server, an inbound audio communication request initiated by an unregistered outside device and directed at a wireless inmate device located inside of an incarceration facility, wherein the wireless inmate device includes a Wi-Fi radio that is associated with a predetermined and unique telephone number, and wherein the inbound audio communication request is a request to establish a real-time audio and/or video communication session between the unregistered outside device and the wireless inmate device;

automatically authorizing, by the server, the audio communication request without manual intervention when a telephone number associated with the unregistered outside device is present in a list of telephone numbers associated with the wireless inmate device; and establishing, by the server, the real-time audio and/or video communication session between the wireless inmate device and the unregistered outside device responsive to the automatic authorization of the audio communication request, wherein real-time audio and/or video communication between the wireless inmate device and the unregistered outside device occurs during the real-time audio and/or video communication session.

16. The method of claim 15, wherein authorizing the audio communication request further comprises an initial authorization performed by an entity that provisions an incarceration facility with the wireless inmate device.

17. The method of claim 16, responsive to the initial authorization, displaying a prompt via a user interface of the wireless inmate device, wherein the prompt is configured to permit an inmate associated with the wireless inmate device to authorize or decline establishment of an audio communication between the wireless inmate device and the unregistered outside device.

18. The method of claim 17, further comprising establishing the audio communication between the wireless inmate device and the unregistered outside device, responsive to a selection via the prompt to authorize the audio communication.

19. The method of claim 17, further comprising responsive to a selection via the prompt to decline the audio communication, providing a decline notification to the unregistered outside device, wherein the decline notification includes:

an indication that the audio communication has been declined; and a prompt for the unregistered outside device to pay for the audio communication between the wireless inmate device and the unregistered outside device.

* * * * *